United States Patent
Vuckovic

(10) Patent No.: US 9,434,008 B2
(45) Date of Patent: Sep. 6, 2016

(54) PORTABLE ATTACHMENT FOR ALIGNING A POWER TOOL AND METHOD

(71) Applicants: Robert Bosch Tool Corporation, Broadview, IL (US); Robert Bosch GmbH, Stuttgart (DE)

(72) Inventor: Miroslav Vuckovic, Skokie, IL (US)

(73) Assignees: Robert Bosch Tool Corporation, Broadview, IL (US); Robert Bosch GmbH, Stuttgart (DE)

(*) Notice: Subject to any disclaimer, the term of this patent is extended or adjusted under 35 U.S.C. 154(b) by 226 days.

(21) Appl. No.: 13/714,635

(22) Filed: Dec. 14, 2012

(65) Prior Publication Data

US 2014/0169897 A1    Jun. 19, 2014

(51) Int. Cl.
  B23B 45/14    (2006.01)
  B23B 47/26    (2006.01)
  B25H 1/00    (2006.01)
  B23B 39/00    (2006.01)

(52) U.S. Cl.
  CPC ............. B23B 47/26 (2013.01); B25H 1/0021 (2013.01); *B23B 39/006* (2013.01); *B25H 1/0057* (2013.01); *B25H 1/0064* (2013.01); *Y10S 408/712* (2013.01); *Y10T 408/03* (2015.01); *Y10T 408/5626* (2015.01); *Y10T 408/5647* (2015.01); *Y10T 408/6779* (2015.01); *Y10T 408/6786* (2015.01)

(58) Field of Classification Search
  CPC  B23B 39/006; B25H 1/0064; B25H 1/0057; B25H 1/0021; Y10T 408/712; Y10T 408/5626; Y10T 408/6779; Y10T 408/6786
  USPC ........... 408/712, 135, 136, 111, 99; 144/104
  See application file for complete search history.

(56) References Cited

U.S. PATENT DOCUMENTS

| | | | | |
|---|---|---|---|---|
| 1,922,532 A * | 8/1933 | Ehlen | ............... | 408/99 |
| 2,261,746 A * | 11/1941 | Seaboly | ............ | 408/99 |
| 2,642,761 A * | 6/1953 | Goldberg | ............ | 408/99 |
| 2,695,525 A * | 11/1954 | Butcnhoff | ........... | 74/169 |
| 2,761,440 A * | 9/1956 | Schwab | ............ | 408/111 |
| 2,835,147 A * | 5/1958 | Baifour, Jr. | ......... | 408/99 |
| 2,938,411 A * | 5/1960 | Herfurth | ............ | 408/76 |
| 3,538,794 A * | 11/1970 | Grundmeyer | ............ | 408/92 |
| 4,468,159 A * | 8/1984 | Oster | ............... | 408/56 |
| 4,582,456 A | 4/1986 | Imai | | |
| 4,740,119 A | 4/1988 | Lierz | | |
| 5,954,460 A | 9/1999 | Degen et al. | | |
| 6,095,724 A | 8/2000 | Hurt | | |
| 6,692,201 B2 | 2/2004 | Soderman | | |
| 7,862,265 B1 | 1/2011 | Clark | | |
| 2005/0276670 A1* | 12/2005 | Freund | ............ | 408/129 |
| 2009/0162158 A1* | 6/2009 | Glodowski et al. | ......... | 408/136 |

* cited by examiner

*Primary Examiner* — Eric A Gates
*Assistant Examiner* — Paul M Janeski
(74) *Attorney, Agent, or Firm* — Maginot Moore & Beck LLP

(57) ABSTRACT

An aligning attachment includes a support aligned relative to a workpiece by a base and a collar slidably connected to the support. The aligning attachment is connected to a power tool and the power tool is guided toward the workpiece by the collar. The translation of the power tool is controlled by a control force applied to a lever pivotally connected to the collar. The lever cooperates with the support to transfer the control force to the support and the collar to counteract an input force applied to the power tool. The control force and associated reaction forces on the support and the lever lie approximately in the same plane. A user controls the translation of the power tool device by increasing or decreasing the control force applied to the lever.

18 Claims, 6 Drawing Sheets

PORTABLE ATTACHMENT FOR ALIGNING A POWER TOOL AND METHOD

FIELD OF THE INVENTION

The present disclosure relates to drill stands and, more particularly, to portable attachments for aligning power tool devices.

BACKGROUND

In general, portable drill stands include at least one rod or similar guiding structure that is used to guide an associated power tool toward an object or a surface to be operated upon by the power tool. The guiding structure of such drill stands is typically affixed to a base to maintain an orientation of the guiding structure relative to the object or the surface. The power tool is attached to a moveable member that is guided by the guiding structure to maintain a desired orientation of the power tool as the power tool is translated. In some known drill stands, a lever is operably connected to the movable member to enable a user to apply an actuation force to the power tool to engage the power tool with the object or the surface.

In operation, portable drill stands require sufficient pressure between the base and the surface to provide non-slip frictional contact therebetween and to ensure perpendicularity of the guiding structure to the surface. A spring or similar compression member is often used between the movable member and the base to generate the needed pressure on the base. This configuration is often deficient because the force on the base and, thus, the pressure between the base and surface, is defined solely by the compression rate of the spring. Therefore, improvements to portable drill stands that enable increased control of the force on the base during operation of the drill stand are desirable. Moreover, improvements to portable drill stands that enable a user to increase control of the motion of the power tool are also desirable.

SUMMARY

An aligning attachment has been developed in a first embodiment for aligning a power tool device relative to a workpiece and for controlling a motion of the power tool device toward the workpiece. The aligning attachment includes an elongated support defining transverse grooves spaced along the length of the support, a base configured to align the support relative to a workpiece, a collar slidably connected to the support and configured to guide a translation of a power tool in response to an input force, and a lever rotably connected to the collar at a pivot, the lever having a first end meshingly engaged with the grooves of the support and a second end configured to receive a control force to control the translation of the power tool, the engagement of the first end with the grooves being configured to generate a reaction force that lies approximately in the same plane as the control force received at the second end.

An aligning attachment has been developed in a second embodiment for aligning a power tool device relative to a workpiece and for controlling a motion of the power tool device toward the workpiece. The aligning attachment includes an elongated support having an elongated reaction surface along the length of the support, a base configured to align the support relative to a workpiece, a collar slidably connected to the support and configured to guide a translation of a power tool in response to an input force, and a lever rotably connected to the collar at a pivot, the lever having a first end that cooperates with the reaction surface of the support and a second end configured to receive a control force to control the translation of the power tool, the cooperation of the first end with the support being configured to generate a reaction force that lies approximately in the same plane as the control force received at the second end.

A method has been developed for operating the aligning attachment. The method includes applying an input force to a power tool guided by a collar to translate the power tool towards a workpiece, the collar being slidably connected to an elongated support aligned relative to the workpiece by a base, and controlling the translation of the power tool by applying a control force to a lever rotably connected to the collar, the lever having a first end configured to cooperate with the support and a second end configured to receive the control force.

DETAILED DESCRIPTION

Figure 1:
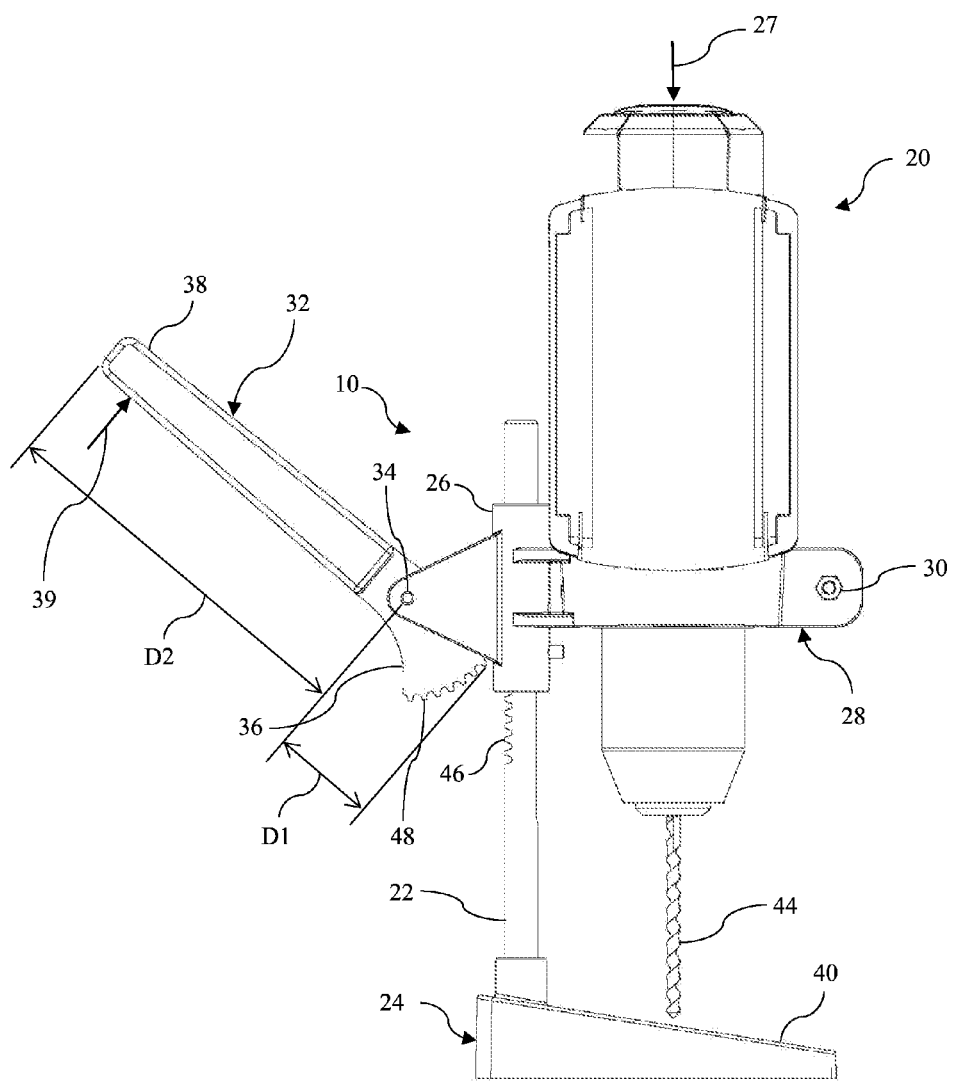
FIG. 1 is a side view of an aligning attachment and an associated power tool device in a first position.

For the purpose of promoting an understanding of the principles of the disclosure, reference will now be made to the embodiments illustrated in the drawings and described in the following written specification. It is understood that no limitation to the scope of the disclosure is thereby intended. It is further understood that the disclosure includes any alterations and modifications to the illustrated embodiments and includes further applications of the principles of the disclosure as would normally occur to one skilled in the art to which this disclosure pertains.

Figure 2:
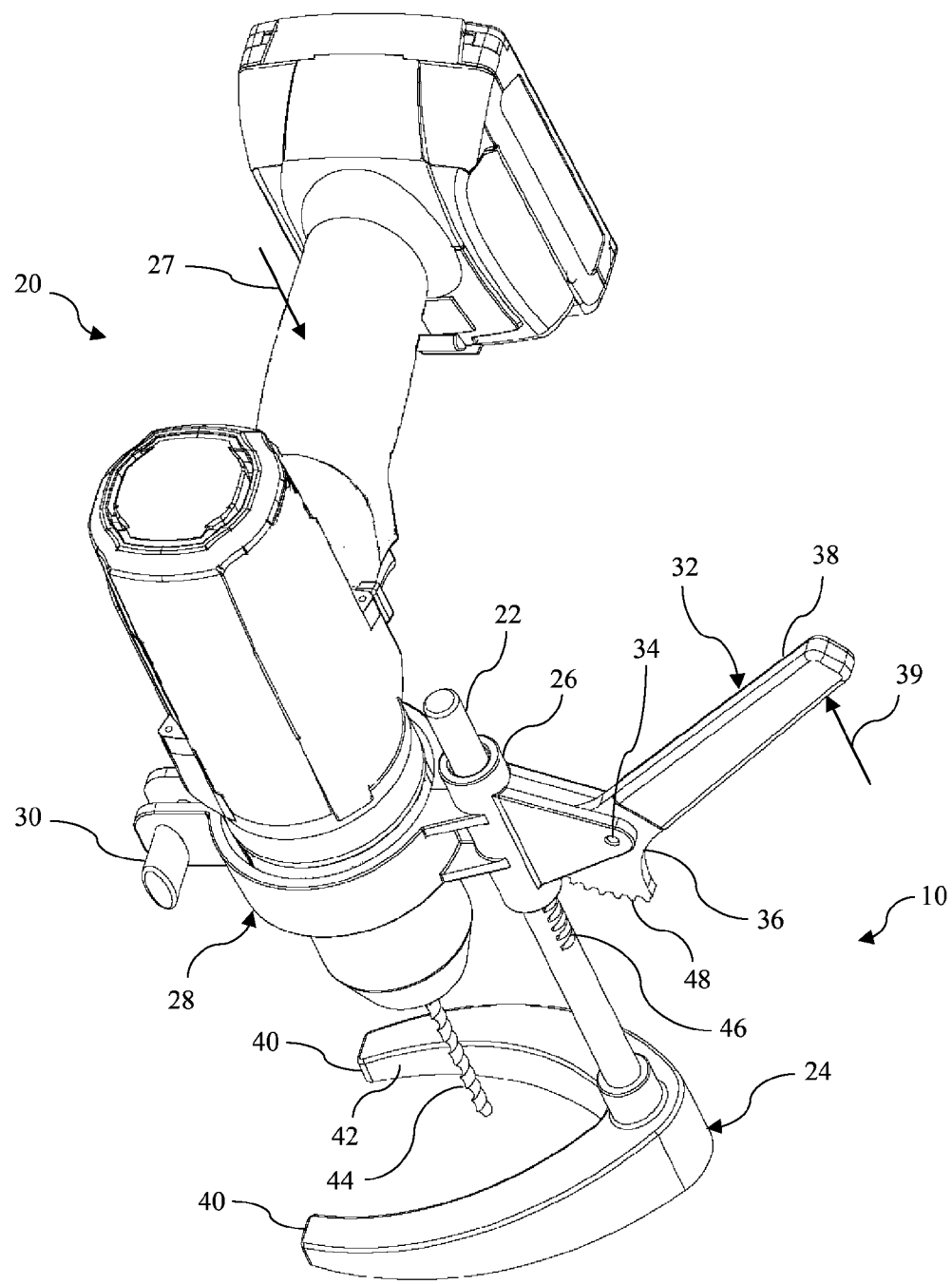
FIG. 2 is a perspective view of the aligning attachment and the power tool device of FIG. 1.

FIGS. 1 and 2 show an embodiment of a portable aligning attachment 10 with an associated power tool device 20 in a first position. The aligning attachment 10 includes an elongated support 22 fastened to a base 24 that is configured to align the support 22 relative to a workpiece. The fastening of the support 22 to the base 24 can be accomplished by any fastening method that provides a rigid connection between the support 22 and the base 24. For instance, the support 22 can be provided with a press-fit or threaded engagement or can be rigidly connected such as by welding. As used herein, a "workpiece" is any object or surface that the power tool device 20 is configured to operate upon. In some embodiments, the workpiece is the surface onto which the base 24 is positioned to align the support 22.

The drill stand 10 further includes a collar 26 that is slidably connected to the support 22. The collar 26 is configured to guide the power tool device 20 along a path defined by the support 22 in response to an input force applied to the power tool device 20. The approximate direction of the input force on the power tool device 20 is shown via arrow 27. A nominal gap is provided between the collar 26 and the support 22 to ensure that the collar 26 slides freely along the path defined by the support 22 and that the collar 26 remains aligned with the support 22 over a travel of the collar relative to the support 22.

The collar 26 includes a mounting portion 28 that receives the power tool device 20. The mounting portion 28 is configured to receive any power tool device, e.g., corded devices, cordless devices, hand-held devices, etc. In one embodiment, the mounting portion 28 is integral with the collar 26 such that the collar 26 and the mounting portion 28 are formed as a single structure. In another embodiment, the mounting portion 28 is affixed to the collar 26 using any known fastening method.

The mounting portion 28 includes a fastening member 30 that is configured to secure the aligning attachment 10 and the power tool device 20 together. For instance, in the embodiment shown, the fastening member 30 is tightened to lock the power tool device 20 in a fixed orientation relative to the mounting portion 28 and the collar 26. Other configurations of the mounting portion 28 and the fastening member 30 can be implemented to secure the aligning attachment 10 and the power too device 20 together. For example, the mounting portion 28 can be configured as a clamp that is operable via the fastening member 30 to grip features of the power tool device 20. The power tool device 20 can also define a threaded mounting hole into which the fastening member 30 is inserted and tightened to secure the aligning attachment 10 and the power tool device 20.

Figure 3:
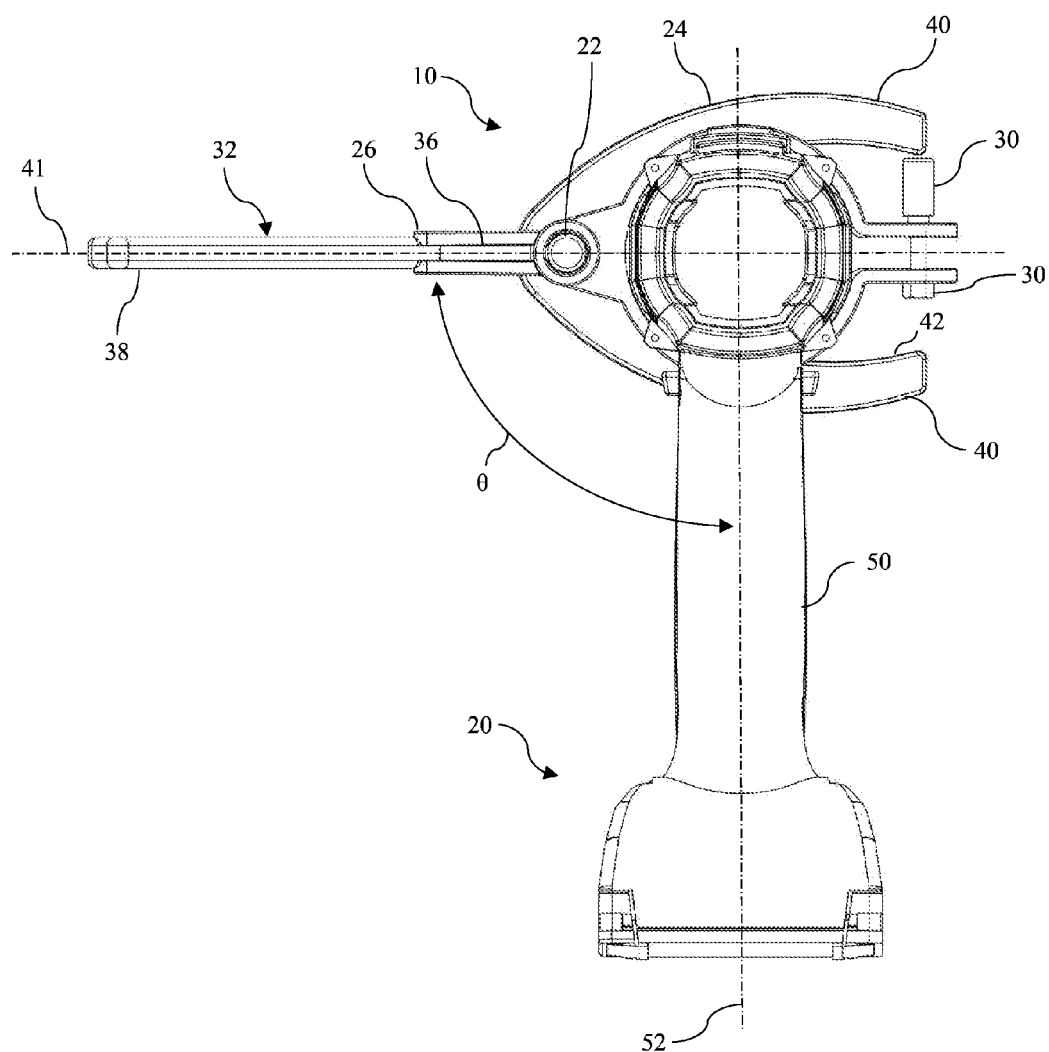
FIG. 3 is a top view of the aligning attachment and the power tool device of FIG. 1 showing the orientation of a lever of the aligning attachment in relation to a grip of the power tool device.

The aligning attachment 10 further includes a lever 32 that is rotably connected to the collar 26 at a pivot 34 defined by the collar 26. The lever 32 has a first end 36 that cooperates with the support 22 and a second end 38 that is configured to receive a control force. The control force, shown in the direction of arrow 39, is applied to the second end 38 of the lever 32 to counteract the input force 27 applied to the power tool device 20. The counteraction of the input force 27 by the control force 39 controls the translation of the power tool device 20. The control force 39 lies approximately in a plane indicated by line 41 (FIG. 3).

The cooperation of the first end 36 with the support 22 is configured to generate a reaction force on the first end 36 of the lever 32 that lies in substantially the same plane as the control force 39 received at the second end 38 of the lever 32. An equal and opposite reaction force is generated downwardly on the support 22 in a direction towards the base 24 and parallel to the translation of the power tool.

The control force 39 received by the second end 38 of the lever 32, the reaction force on the first end 36 of the lever 32, and the reaction force on the support 22 are all coincident on the same plane 41. This plane passes through a symmetrical bisection of the base 24 (FIG. 3). In this embodiment, the base 24 has legs 40 that define an opening 42 for a tool 44 of the power tool device 20 to engage the workpiece. Because the reaction force on the support 22 passes through the symmetrical bisection of the base 24, the reaction force is counteracted equally by the legs 40 of the base 24 on each side of the symmetrical bisection.

In one embodiment of the cooperation of the first end 36 of the lever 32 with the support 22, the support 22 is elongated and defines a plurality of transverse grooves 46 that are spaced along the length of the support 22. The first end 36 of the lever 32 cooperates with the support 22 via a meshing engagement of the first end 36 with the grooves 46. The first end 36 is thus formed as a plurality of teeth 48 that engages with the grooves 46 of the support 22. The plurality of teeth 48 is formed along a portion of the first end 36 of the lever 32 at a constant radius from the pivot 34, essentially forming a sector gear.

In this embodiment, one or more of the number of teeth of the plurality of teeth 48 and the number of grooves 46 of the support 22 define a maximum rotation of the lever 32 about the pivot 34 of the collar 26. The maximum rotation of the lever 32 in this embodiment is less than or equal to ninety (90) degrees regardless of a maximum translation of the collar 26 along the support 22.

Figure 6:
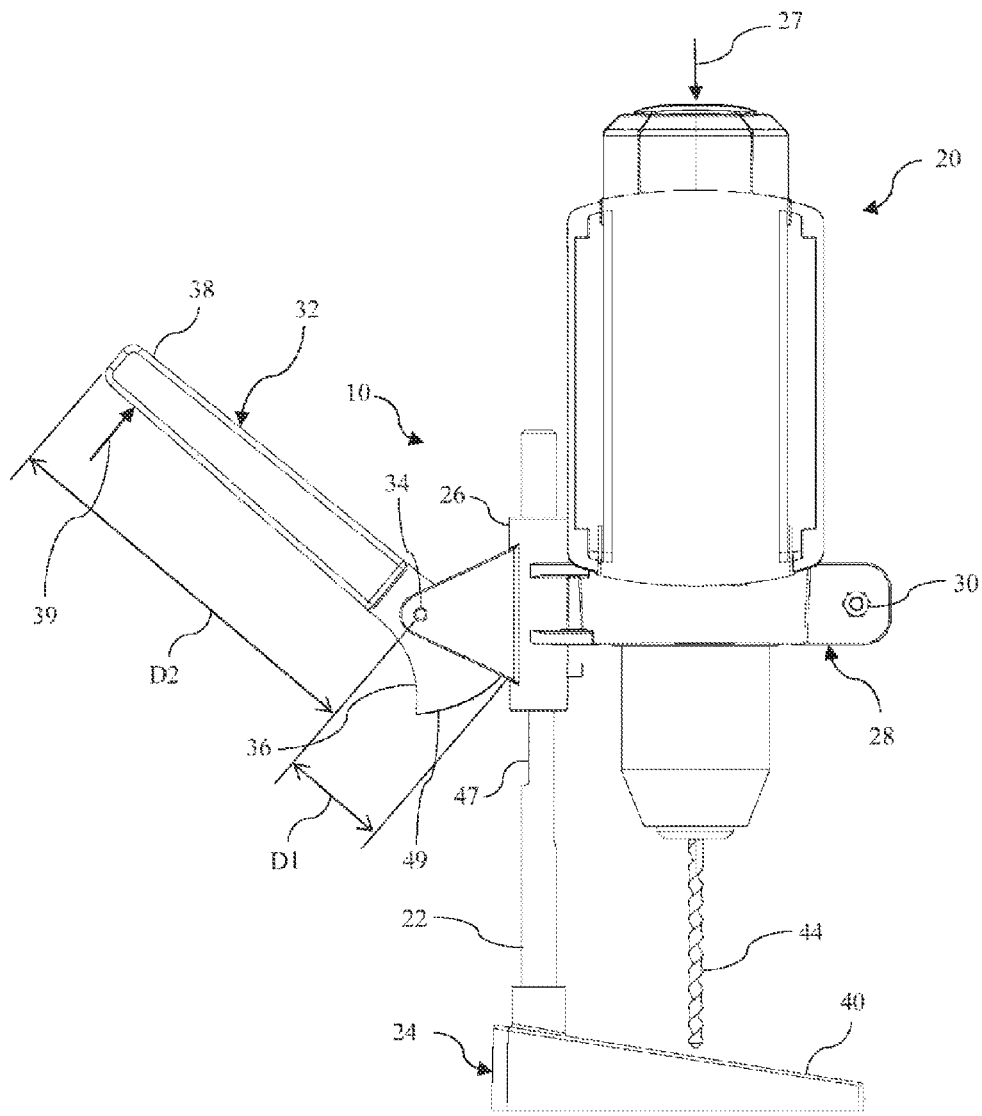
FIG. 6 is a side view of the power tool device of FIG. 1 and an alternative embodiment of an aligning attachment in a first position.

In another embodiment of the cooperation of the first end 36 of the lever 32 with the support 22, as depicted in FIG. 6, the first end 36 of the lever 32 has a smooth, arcuate surface 49 extending over a portion thereof. The support 22 in this embodiment has an elongated reaction surface along the length of the support, such as a flat portion 47, onto which the first end 36 cooperates to transfer the control force 39. The surface of the first end 36 that cooperates with the reaction surface of the support 22 is preferably formed from an elastomeric material, which can be reinforced to improve durability.

Referring now to FIG. 1, the spacing of the first and second ends 36, 38 of the lever 32 relative to a rotational axis of the lever 32 provides mechanical advantage to the control force 39 applied to the lever 32. In some embodiments, the rotational axis of the lever 32 is fixed and concentric with the pivot 34 of the collar 26. The lever 32 has a first distance $D_1$ measured from the first end 36 to the pivot 34 and a second distance $D_2$ measured from the second end 38 to the pivot 34. The ratio of the second distance $D_2$ to the first distance $D_1$ as shown in FIG. 1 is approximately 3.75 to 1. The ratio of the second distance $D_2$ to the first distance $D_1$ can be greater than or less than 3.75 to 1 as long as the input force 27 applied to the power tool device 20 can be adequately sensed or "felt" by a user through the lever 32.

In other embodiments, the rotational axis of the lever 32 can translate, for example, within a respective slot formed in the lever 32 or the collar 26. The ratio of the second distance $D_2$ to the first distance $D_1$ in these embodiments can vary over the rotation of the lever 32 to adjust the mechanical advantage to the control force 39. For instance, the distance from the first end 36 to the rotational axis of the lever 32 can increase or decrease along the portion of the first end 36 that cooperates with the support 22. This variable ratio can be used to adjust the mechanical advantage to the control force 39 over the rotation of the lever 32 to improve user perception of the input force 27. User perception of the input force 27 through the lever 32 is discussed in more detail below.

FIG. 3 shows the orientation of the lever 32 relative to an elongated grip 50 of the power tool device 20. The grip 50 of the power tool device 20 in this embodiment defines a grip axis 52 passing therethrough. The grip axis 52 is oriented approximately perpendicular to the plane (indicated by line 41) along which lever 32 extends. Thus, when viewed from the top as shown in FIG. 3, the lever 32 is oriented at an angle θ that is approximately ninety (90) degrees from the grip axis 52. This orientation provides the user with an ergonomic position in which to simultaneously operate the lever 32 and the power tool device 20. Moreover, the reaction forces generated by the control force 39 are substantially equal along the legs 40 of the base 24.

Figure 4:
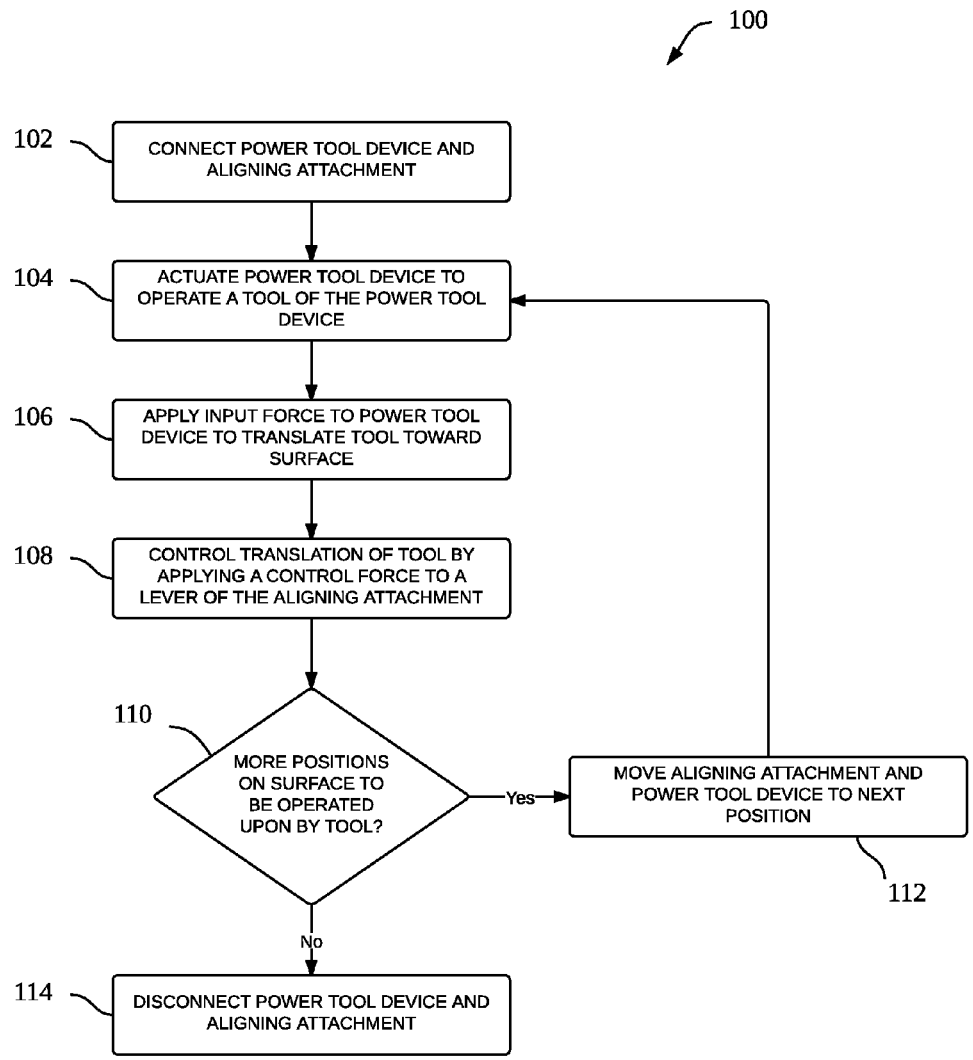
FIG. 4 is a flow diagram of a method for operating the aligning attachment and the power tool device of FIG. 1.

A flow diagram of a method 100 for operating a portable aligning attachment is shown in FIG. 4. The method 100 is described with reference to the aligning attachment 10 and the associated power tool device 20 shown in FIGS. 1 and 5. A user implements the method 100 by first connecting the power tool device 20 and the aligning attachment 10 together (block 102). The device 20 is placed within the mounting portion 28 and the fastening member 30 is tightened to lock the power tool device 20 in a fixed orientation relative to the workpiece to be operated upon by the power tool device 20.

Because the aligning attachment 10 does not include a compression member between the base 24 and the collar 26 to return and/or maintain the collar 26 in the first position, the user positions the collar 26 in the first position either by holding the lever 32 in the position shown in FIG. 1 or by directly manipulating the position of the collar 26. As used herein, the "first position" is any position of the collar 26 that permits the power tool device 20 and the aligning attachment 10 to be connected without contacting the workpiece to be operated upon by the power tool device 20.

Once the power tool device 20 and the portable drill stand 10 are attached (block 102), and the collar 26 is held in the first position, the user actuates the power tool device 20 to operate the tool 44 of the power tool device 20 (block 104). In the embodiment shown in FIGS. 1 and 5, the tool 44 is a drill bit configured to drill a hole into the surface onto which the aligning attachment 10 is positioned. The light weight and portable nature of the aligning attachment 10 enable it to be positioned on surfaces at various orientations relative to the user, such as for drilling holes into the walls, ceilings, or floors of a building.

The user applies an input force 27 to the power tool device 20 to translate the power tool device 20 toward the surface to be drilled (block 106). The power tool device 20 and the collar 26 to which the power tool device 20 is attached are guided in a fixed orientation relative to the surface by the support 22. The power tool device 20 translates toward the surface until the tool 44 of the power tool device 20 engages the surface. Progression of the tool bit into the surface can be variable depending on a number of factors including, but not limited to, the composition of the surface, the geometry and composition of the drill bit, the speed at which the drill bit rotates, and the magnitude of the input force 27 applied to power tool device 20.

To control the translation of the power tool device 20 and to control the progression of the tool 44 into the surface, the user applies a control force 39 to the lever 32 in the direction of arrow 39 (block 108). Application of the control force 39 to the lever 32, when made simultaneously with application of the input force 27 to the power tool device 20, generates a reaction force on the support 22 that increases the pressure between the base 24 and the surface. This increased pressure advantageously improves the frictional contact between the base 24 and the surface 22 and ensures that the base 24 and the support 22 remain in the desired orientation relative to the surface during translation of the power tool device 20.

The translation of the power tool device 20 toward or away from the surface is controlled by the user increasing or decreasing one or more of the input force 27 applied to the power tool device 20 and the control force 39 applied to the lever 32. For instance, for a constant input force applied to the power tool device 20, translation of the power tool device 20 toward the surface can be stopped and/or held by increasing the control force 39 applied to the lever 32 until no additional translation is perceived. From this static, force-balanced position of the power tool device 20, translation toward the surface can be initiated by reducing the control force 39 on the lever 32 until translation is perceived. Again, from the static, force-balance position of the power tool device 20, translation away from the surface can be initiated by increasing the control force 39 on the lever 32 until translation is perceived. The user can apply the control force 39 to the lever 32 in any sequence to stop/hold, lower, and/or raise the power tool device 20.

Figure 5:
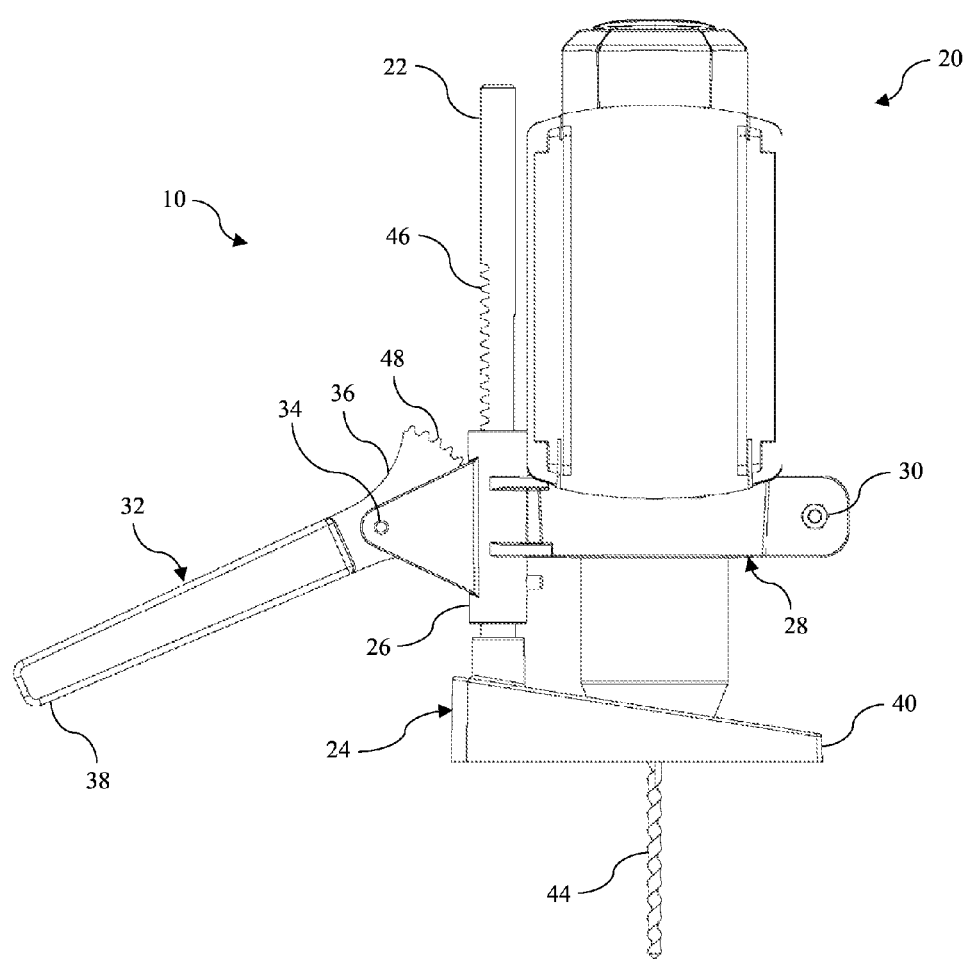
FIG. 5 is a side view of the aligning attachment and the power tool device of FIG. 1 in a second position.

The above principles of controlling the translation of the power tool device 20 are applicable after the tool 44 of the power tool device 20 engages the surface to be drilled. Referring now to FIG. 5, the lever 32 rotates downwardly in a counterclockwise manner (as viewed in the figure) as the power tool device 20 translates toward the surface. This counterclockwise rotation continues until the collar 26 reaches the second position, which, in the figure, represents a maximum translation of the tool 44 of the power tool device 20 into the surface. As used herein, the "second position" is any position of the collar 26 that permits the tool 44 to fully engage the surface without the power tool device 20 itself contacting the surface.

At various positions of engagement of the tool 44 with the surface, there can be little or no detectable translation of the power tool device 20. For a constant input force on the power tool device 20 while the tool 44 is engaging the surface, but is not progressing into it, increasing the control force 39 on the lever 32 reduces the magnitude of the input force 27 transferred to the tool 44. Further increasing the control force 39 on the lever 32 eventually counterbalances the input force 27 on the power tool and stops the tool 44 from progressing further into the surface. At this static, force-balanced position, further increasing the control force 39 on the lever 32 overcomes the constant input force 27 on the power tool device 20 and causes the power tool device 20 to translate away from the surface.

After a position on the surface has been drilled by the power tool device 20, the user determines if there are more positions on the surface that require drilling (block 110). If there are more positions that require drilling, the aligning attachment 10 and the associated power tool device 20 are moved to these additional positions (block 112) and blocks 104-108 are repeated. The portability of the aligning attachment 10 makes it practical to carry the aligning attachment 10 on the power tool device 20 when multiple positions require drilling or if alignment is not necessary for each position to be drilled. If there are no additional positions that require drilling, the power tool device 20 and the portable drill stand 10 can be disconnected from one another (block 114).

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. An aligning attachment, comprising:
an elongated support defining transverse grooves spaced along the length of the support;
a collar defining a bore configured to receive the support, the collar being slidably connected to the support through the bore so as to guide a translation of a power tool towards a surface in response to an input force applied to the power tool and carried by the collar;
a base directly and rigidly connected to the support, the base being adjustably positionable on the surface so as to align the collar relative to the surface; and
a lever rotably connected to the collar at a pivot, the lever having a first end extending into the bore and meshingly engaged with the grooves of the support and a second end configured to receive a control force applied to the second end simultaneously with and separate from the input force to control the translation of the power tool, wherein the second end is configured so that the control force originates on and lies approximately along a control force plane, and wherein the engagement of the first end with the grooves is configured to generate a reaction force that originates on and lies approximately along the control force plane.

2. The aligning attachment of claim 1, wherein the collar has a maximum translation along the support, and wherein a maximum rotation of the lever is less than or equal to 90 degrees regardless of the maximum translation of the collar.

3. The aligning attachment of claim 2, wherein the first end is formed as a plurality of teeth, and wherein one or more of the number of teeth and the number of grooves define the maximum rotation of the lever.

4. The aligning attachment of claim 1, wherein the first end is formed as a sector gear.

5. The aligning attachment of claim 1, wherein the lever has a first distance from the first end to the pivot and a second distance from the second end to the pivot, and wherein a ratio of the second distance to the first distance is approximately 3.75 to 1.

6. The aligning attachment of claim 1, wherein an elongated grip of the power tool defines a grip axis and the length of the lever defines a lever axis, and wherein the lever axis is oriented approximately 90 degrees from the grip axis when viewed in a direction parallel to the translation of the power tool.

7. The aligning attachment of claim 1, wherein the collar includes a mounting portion configured to receive the power tool.

8. The aligning attachment of claim 7, wherein the mounting portion includes a fastening member that is configured to be tightened to lock and hold the power tool.

9. The aligning attachment of claim 7, wherein the mounting portion and the pivot are positioned on the collar at approximately the same distance from the base.

10. The aligning attachment of claim 9, wherein the mounting portion positions an elongated grip of the power tool at a greater distance from the base than the distance from the base to the pivot.

11. The aligning attachment of claim 1, wherein the base defines an opening for a tool of the power tool to engage the workpiece.

12. A method of operating an aligning attachment, comprising:

applying an input force to a power tool guided by a collar to translate the power tool towards a surface, the collar defining a bore through which an elongated support is received to slidably connect the collar to the elongated support, the collar being aligned relative to the surface by a base that is directly and rigidly connected to the support and adjustably positionable on the surface; and controlling the translation of the power tool by simultaneously applying a control force to a lever rotably connected to the collar, the lever having a first end extending into the bore and configured to cooperate with the support and a second end configured to receive the control force, wherein the collar has a maximum translation along the support, and wherein a maximum rotation of the lever is less than or equal to 90 degrees regardless of the maximum translation of the collar.

13. The method of claim 12, wherein the control force is increased to counteract the input force and slow the translation of the power tool toward the workpiece.

14. The method of claim 12, wherein the control force is increased to counteract the input force and stop the translation of the power tool toward the workpiece in a force-balanced position.

15. The method of claim 12, wherein the control force is increased to counteract the input force and reverse the translation of the power tool away from the workpiece.

16. The method of claim 12, wherein the control force is one or more of increased, decreased, and held constant to control the translation of the power tool.

17. The method of claim 12, wherein the first end of the lever is formed as a plurality of teeth, and wherein the support defines transverse grooves spaced along the length of the support into which the teeth of the first lever meshingly engage.

18. The method of claim 12, wherein the first end of the lever is an arcuate surface, and wherein the support has an elongated flat reaction surface onto which the first end cooperates to transfer the control force.

* * * * *